(12) United States Patent
Hagedorn et al.

(10) Patent No.: US 6,315,850 B1
(45) Date of Patent: Nov. 13, 2001

(54) BONDED STRUCTURE OF DIFFERENT MATERIALS WHICH IS SUBSTANTIALLY STRESS-FREE

(75) Inventors: Fred B. Hagedorn, Orlando; William F. Cashion, Oviedo, both of FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/531,419

(22) Filed: Mar. 20, 2000

Related U.S. Application Data

(62) Division of application No. 08/999,858, filed on Nov. 21, 1997, now Pat. No. 6,077,612.

(51) Int. Cl.$^7$ ................................................. B32B 31/00
(52) U.S. Cl. ..................... 156/228; 156/358; 156/359; 156/583.1
(58) Field of Search ............................. 156/64, 228, 358, 156/359, 580, 583.1; 100/50, 315, 319

(56) References Cited

U.S. PATENT DOCUMENTS

| | | |
|---|---|---|
| 2,401,987 | 6/1946 | Taylor et al. . |
| 2,965,530 | 12/1960 | Stamm et al. . |
| 3,065,533 | 11/1962 | Dungan et al. . |
| 3,284,174 | 11/1966 | Zimmer . |
| 3,549,337 | 12/1970 | Palmer . |
| 3,625,792 | 12/1971 | Shaffer . |
| 3,879,251 | 4/1975 | Ingham . |
| 3,967,997 | 7/1976 | Masters . |
| 4,223,429 | 9/1980 | Robinson . |
| 4,314,866 | 2/1982 | Webber . |
| 4,349,333 | 9/1982 | Bowles . |
| 4,449,703 | 5/1984 | Robinson . |
| 4,705,585 | 11/1987 | Kelly et al. . |
| 4,729,441 | 3/1988 | Peetz et al. . |

(List continued on next page.)

FOREIGN PATENT DOCUMENTS

| | | |
|---|---|---|
| 3732360 | 4/1989 | (DE) . |
| 4425209 | 1/1996 | (DE) . |

OTHER PUBLICATIONS

Patent Abstracts of Japan, Yasuhiro, Omura et al., vol. 014, No. 331, Jul. 17, 1990, and JP 02 113935 A (Nippon Steel Corp.), Apr. 26, 1990.

Database WP1, Section Ch, Week 951—8XP 002039964, Derwent Publications Ltd., London, GB; AN 95–136403 Mach 7, 1995.

*Primary Examiner*—James Sells

(57) ABSTRACT

A process and apparatus for bonding together two layers of dissimilar material, yielding a composite structure which is substantially stress-free at a selectable reference temperature and reference isostatic pressure, which includes providing a first layer and a second layer; determining a critical line for the first layer and second layer in a pressure-temperature plane wherein a location of the critical line depends on the selectable reference temperature and reference isostatic pressure and depends on coefficients of thermal expansion and bulk moduli material constants of the first layer and the second layer, wherein the critical line sets forth a plurality of temperature-pressure pairs at which the composite structure will be substantially stress-free; controlling a temperature and an isostatic pressure during bonding such that the temperature and the isostatic pressure represent a point on the critical line; bonding the first layer and the second layer at the temperature and the isostatic pressure; and returning to the selectable reference temperature and reference isostatic pressure after bonding is completed by following a path in the pressure-temperature plane which avoids imposing disruptive stresses on the composite structure.

26 Claims, 4 Drawing Sheets

U.S. PATENT DOCUMENTS

| | | |
|---|---|---|
| 4,778,345 | 10/1988 | Ito et al. . |
| 4,812,191 | 3/1989 | Ho et al. . |
| 4,934,579 | 6/1990 | Doble . |
| 4,941,251 | 7/1990 | Sobue et al. . |
| 5,066,536 | 11/1991 | Cogswell et al. . |
| 5,110,542 | 5/1992 | Conaway . |
| 5,161,908 | 11/1992 | Yoshida et al. . |
| 5,163,770 | 11/1992 | Soma et al. . |
| 5,168,620 | 12/1992 | Denney et al. . |
| 5,264,699 | 11/1993 | Barton et al. . |
| 5,281,454 | 1/1994 | Hanson . |
| 5,326,525 | 7/1994 | Ghosh . |
| 5,351,874 | 10/1994 | Rajner et al. . |
| 5,365,345 | 11/1994 | Propst . |
| 5,395,788 | 3/1995 | Abe et al. . |
| 5,769,986 | 6/1998 | Hagedorn . |
| 6,077,612 * | 6/2000 | Hagedorn et al. .................. 428/426 |

* cited by examiner

BONDED STRUCTURE OF DIFFERENT MATERIALS WHICH IS SUBSTANTIALLY STRESS-FREE

This application is a divisional of application Ser. No. 08/999,858, filed on Nov. 21, 1997, U.S. Pat. No. 6,077,612 the entire contents of which are hereby incorporated by reference.

BACKGROUND OF THE INVENTION

The invention generally relates to an apparatus and method which achieve a bond between two or more materials of a composite structure, with differing coefficients of thermal expansion (CTE). In particular, the apparatus and method of the present invention produce a substantially stress-free composite structure by applying a large isostatic pressure during the actual bonding process.

Forward looking infrared (FLIR) systems are generally known, particularly for their use in connection with military aircraft which are required to fly at low altitudes and acquire targets at night for the purpose of delivering armorment or ordnance. Current state-of-the-art FLIR systems generally require two separate and distinct infrared sensing systems, which alternately operate in different modes—one system has a wide field of view that develops an IR picture looking ahead of the aircraft in order to present information to a pilot for the purpose of flying the aircraft, in what is called "pilotage" mode. This system is known as the navigation FLIR. Additionally, a separate FLIR system is located on the aircraft, in the "targeting" mode. This second FLIR system has a narrow field of view that has magnification or telescopic properties, such as a zoom capability, so that targets can be located. The targeting FLIR system normally produces a high magnification visual image which enables the pilot to survey and acquire the target in time to maneuver his aircraft for attack and weapon delivery.

Sophisticated optical imaging systems on aircraft generally require some type of sealed enclosure, particularly when exposed to the elements. When one of these optical imaging systems is mounted on an aircraft, particularly high performance military aircraft, it is extremely important to keep the size of the sealed enclosure as small as possible in order to minimize the aerodynamic effects on the aircraft. The sealed enclosure inherently includes some type of infrared window through which the internal optical imaging system can view the outside world. In order to increase system efficiency, it is necessary to make this window as large as possible in order to maximize the amount of light that can be collected for imaging.

Both the state-of-the-art FLIR systems discussed above and conventional infrared search and track (IRST) applications utilize an infrared window through which the internal optical imaging system can view the outside world. These infrared windows are subject to extremely harsh environments. Two of the more harsh operational environments are sand at approximately 470 mph and rain drops at velocities up to Mach 1.5.

One approach for providing an infrared window which can withstand these operational environments includes bonding a standard zinc selenide ZnSe window substrate to a very durable polycrystalline diamond (PCD) with a layer of bonding material. The bonding material for this process can be either a more compliant organic polymer or a more rigid and possibly more durable chalcogenide glass. In processes where the bonding material "sets" (polymerizes or freezes) at an elevated temperature, say above 150° C., the difference in the coefficients of thermal expansion (CTE) between the diamond, most bonding materials, and most substrate materials leads to huge stress in the composite structure when the composite structure cools to room temperature. These stresses frequently exceed the fracture limits of the diamond, the bonding material, or the substrate material.

In order to solve this problem with conventional bonding processes, the present invention bonds a diamond and a substrate, having identical widths and lengths at room temperature and pressure, by first heating the diamond and substrate above room temperature. Since the CTE for the substrate is usually larger than that of the diamond, the substrate's length and width will both be larger at this elevated temperature than the corresponding diamond values. However, the application of isostatic pressure to the diamond and the substrate, maintaining them at the same temperature, causes both to contract. A quantity called a material's bulk modulus is the ratio of the applied pressure to the fractional decrease in volume. Since the bulk modulus for the diamond is usually greater than that of the substrate, one can find an applied isostatic pressure at which the diamond and substrate are once again the same length and width. This length and width will be different, of course, from the length and width at room temperature and atmospheric pressure.

This process is repeated at every temperature, and a critical line can thus be defined in the pressure-temperature (P-T) plane. If the pressure and temperature values are maintained on this line when the solidification of the bonding layer takes place, then the diamond and the substrate will remain substantially stress-free as long as one stays on the critical line.

SUMMARY OF THE INVENTION

One significant feature of the present invention, which allows a substantially stress-free composite structure (at some temperature well below the bonding layer solidification temperature), is the application of a large isostatic pressure during the actual bonding process. The present application discloses, in terms of well-known material parameters, how to determine what the value of the isostatic pressure should be in order to achieve the desired substantially stress-free state.

The desired substantially stress-free state is achieved by providing a process for bonding together two layers of dissimilar material, yielding a composite structure which is substantially stress-free at a selectable reference temperature and reference isostatic pressure, comprising the steps of:

(a) providing a first layer and a second layer;

(b) determining a critical line for the first layer and second layer in a pressure-temperature plane wherein a location of the critical line depends on the selectable reference temperature and reference isostatic pressure and depends on 9 coefficients of thermal expansion and bulk moduli material constants of the first layer and the second layer, wherein the critical line sets forth a plurality of temperature-pressure pairs at which the composite structure will be substantially stress-free;

(c) controlling a temperature and an isostatic pressure during bonding such that the temperature and the isostatic pressure represent a point on the critical line;

(d) bonding the first layer and the second layer at the temperature and the isostatic pressure in said step (c); and (e) returning to the selectable reference temperature and reference isostatic pressure after bonding is completed by following a path in the pressure-temperature plane which avoids imposing disruptive stresses on the composite structure.

This stress-free state is further achieved by providing an apparatus for bonding together two layers of dissimilar material, yielding a composite structure which is stress-free at a selectable reference temperature and reference isostatic pressure, comprising:

(a) means for supporting a first layer and a second layer;

(b) means for determining a critical line for the first layer and the second layer in a pressure-temperature plane, wherein a location of the critical line depends on the selectable reference temperature and reference isostatic pressure and depends on coefficients of thermal expansion and bulk moduli material constants of the first layer and the second layer, wherein the critical line sets forth a plurality of temperature-pressure pairs at which the composite structure will be substantially stress-free;

(c) means for controlling a temperature and isostatic pressure during bonding such that the temperature and the isostatic pressure represent one or more points on the critical line; and (d) means for bonding the first layer and the second layer at the temperature and the isostatic pressure in said step (c);

(e) means for returning to the selectable temperature and reference isostatic pressure after bonding is complete by following a path in the pressure-temperature plane which avoids imposing disruptive stresses on the composite structure.

This stress-free state is further achieved by providing a process for producing a stress-free bond at ambient temperature and pressure between two layers of dissimilar material comprising the steps of:

(a) providing a first layer with a coefficient of thermal expansion which is smaller than a coefficient of thermal expansion of a second layer, with a thickness which is smaller than a thickness of the second layer, and with a thermal conductivity which is larger than a thermal conductivity of the second layer;

(b) providing a bonding layer, having a thickness substantially less than the thickness of the first layer, with a softening temperature above the ambient temperature, at the ambient pressure;

(c) arranging the first layer and the second layer, with the bonding layer in between the first layer and the second layer;

(d) placing a heat sink in thermal contact with a surface of the second layer opposite to a surface which is in contact with the bonding layer;

(e) placing a pulsed heat source in thermal contact with a surface of the first layer which is opposite to a surface which is in contact with the bonding layer;

(f) applying a compressional force between the pulsed heat source and the heat sink so as to compress the first layer and the second layer so that the bonding layer flows when the bonding layer reaches its softening or melting temperature; and (g) applying a heat pulse of an intensity and duration sufficient to melt or soften the bonding layer to raise an interfacial surface temperature of the second layer above a melting or softening temperature of the bonding layer without substantially heating a remainder of the second layer.

This stress-free state is further achieved by providing an apparatus for producing a stress-free bond at ambient temperature and pressure between two layers of dissimilar material comprising:

support means for supporting a first layer with a coefficient of thermal expansion smaller than a coefficient of thermal expansion of a second layer, with a thickness smaller than a thickness of the second layer, and with a thermal conductivity larger than a thermal conductivity of the second layer, and supporting a thin thermo-setting bonding layer with a softening temperature above the ambient temperature, at the ambient pressure;

wherein the first layer, the second layer and the bonding layer are arranged as a sandwich, with the bonding layer in between the first layer and the second layer;

a heat sink in thermal contact with a surface of the second layer opposite to a surface which contacts the bonding layer;

a pulsed heat source in thermal contact with a surface of the first layer which is opposite to a surface which contacts the bonding layer;

force means for applying a compressional force between the pulsed heat source and the heat sink so as to compress the sandwich so that the bonding layer flows when its softening or melting temperature is reached;

wherein the pulsed heat source applied a heat pulse to the sandwich of an intensity and duration sufficient to melt or soften the bonding layer and to raise an interfacial surface temperature of the second layer above the melting or softening temperature of the bonding layer without substantially heating a remainder of the second layer.

This stress-free state exists in a multi-layer structure with a stress-free bond at ambient temperature and pressure between two layers of dissimilar material comprising:

a first layer;

a second layer with a coefficient of thermal expansion larger than a coefficient of thermal expansion of said first layer, with a thickness larger than a thickness of said first layer, and with thermal conductivity smaller than a thermal conductivity of said first layer; and a thin bonding layer with a softening temperature above the ambient temperature, at ambient pressure;

wherein said first layer, said second layer, and said bonding layer are arranged as a sandwich, with the bonding layer in between said first layer and said second layer.

This stress-free state is further achieved by a process for bonding together a three layer structure which is substantially stress-free at a selectable reference temperature and reference isostatic pressure, comprising the steps of:

(a) providing a first layer, a second layer, and a bonding layer;

(b) determining a critical line for the first layer and second layer in a pressure-temperature plane wherein a location of the critical line depends on the selectable reference temperature and reference isostatic pressure and depends on coefficients of thermal expansion and bulk moduli material constants of the first layer and the second layer, wherein the critical line sets forth a plurality of temperature-pressure pairs at which the composite structure will be substantially stress-free;

(c) selecting as the bonding layer, a material whose critical line with respect to the first layer, has a smaller slope than a slope of the critical line of the first layer and the second layer;

(d) bonding the first layer and the second layer, utilizing the bonding layer;

(e) increasing a temperature of the three layer structure above a softening temperature of the bonding layer;

(f) increasing a pressure of the three layer structure along a path near the critical line for the first layer and the second layer;

(g) decreasing the pressure and temperature of the three layer structure along a path near the critical line for the first layer and the second layer until the pressure of the three layer structure reaches a point which corresponds to the softening temperature of the bonding layer on the critical line for the first layer and the bonding layer;

(h) applying a heat pulse to an outer surface of the first layer of sufficient intensity and duration to bring the first layer and the bonding layer just above the softening temperature of the bonding layer, while maintaining the pressure constant, thereby allowing the bonding layer to harden at pressure-temperature conditions that will be substantially stress-free when the three layer structure is returned to the selectable reference temperature and reference isostatic pressure; and (i) returning the pressure and temperature of the three layer structure to the selectable reference temperature and reference isostatic pressure along a path near the critical line for the first layer and the second layer.

This stress-free state is further achieved by an apparatus for bonding together a three layer structure which is substantially stress-free at a selectable reference temperature and reference isostatic pressure, comprising:

means for providing a first layer, a second layer, and a bonding layer;

means for determining a critical line for the first layer and second layer in a pressure-temperature plane wherein a location of the critical line depends on the selectable reference temperature and reference isostatic pressure and depends on coefficients of thermal expansion and bulk moduli material constants of the first layer and the second layer, wherein the critical line sets forth a plurality of temperature-pressure pairs at which the composite structure will be substantially stress-free;

means for selecting as the bonding layer, a material whose critical line with respect to the first layer, has a smaller slope than a slope of the critical line of the first layer and the second layer;

means for bonding the first layer and the second layer, utilizing the bonding layer;

means for increasing a temperature of the three layer structure above a softening temperature of the bonding layer;

means for increasing a pressure of the three layer structure along a path near the critical line for the first layer and the second layer;

means for decreasing the pressure and temperature of the three layer structure along a path near the critical line for the first layer and the second layer until the pressure of the three layer structure reaches a point which corresponds to the softening temperature of the bonding layer on the critical line for the first layer and the bonding layer;

means for applying a heat pulse to an outer surface of the first layer of sufficient intensity and duration to bring the first layer and the bonding layer just above the softening temperature of the bonding layer, while maintaining the pressure constant, thereby allowing the bonding layer to harden at pressure-temperature conditions that will be substantially stress-free when the three layer structure is returned to the selectable reference temperature and reference isostatic pressure; and means for returning the pressure and temperature of the three layer structure to the selectable reference temperature and reference isostatic pressure along a path near the critical line for the first layer and the second layer.

This stress-free state is further achieved by a three layer structure which is substantially stress-free at a selectable reference temperature and reference isostatic pressure, comprising:

a first layer, a second layer, and a bonding layer;

wherein a critical line for the first layer and second layer in a pressure-temperature plane is identified;

wherein a location of the critical line depends on the selectable reference temperature and reference isostatic pressure and depends on coefficients of thermal expansion and bulk moduli material constants of the first layer and the second layer;

wherein the critical line sets forth a plurality of temperature-pressure pairs at which the three layer structure will be substantially stress-free;

wherein the bonding layer is made of a material whose critical line with respect to the first layer, has a smaller slope than a slope of the critical line of the first layer and the second layer;

wherein the first layer and the second layer are bonded together utilizing the bonding layer;

wherein a temperature of the three layer structure is increased above a softening temperature of the bonding layer;

wherein pressure of the three layer structure is increased along a path near the critical line for the first layer and the second layer;

wherein the pressure and temperature of the three layer structure is decreased along a path near the critical line for the first layer and the second layer until the pressure of the three layer structure reaches a point which corresponds to the softening temperature of the bonding layer on the critical line for the first layer and the bonding layer;

wherein a heat pulse is applied to an outer surface of the first layer of sufficient intensity and duration to bring the first layer and the bonding layer just above the softening temperature of the bonding layer, while maintaining the pressure constant, thereby allowing the bonding layer to harden at pressure-temperature conditions that will be substantially stress-free when the three layer structure is returned to the selectable reference temperature and reference isostatic pressure; and wherein the pressure and temperature of the three layer structure is returned to the selectable reference temperature and reference isostatic pressure along a path near the critical line for the first layer and the second layer.

These and other objects of the present invention will become more readily apparent from the detailed description given hereafter. However, it should be understood that the detailed description of the specific examples, while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus do not limit the present invention, wherein.

Figure 1:
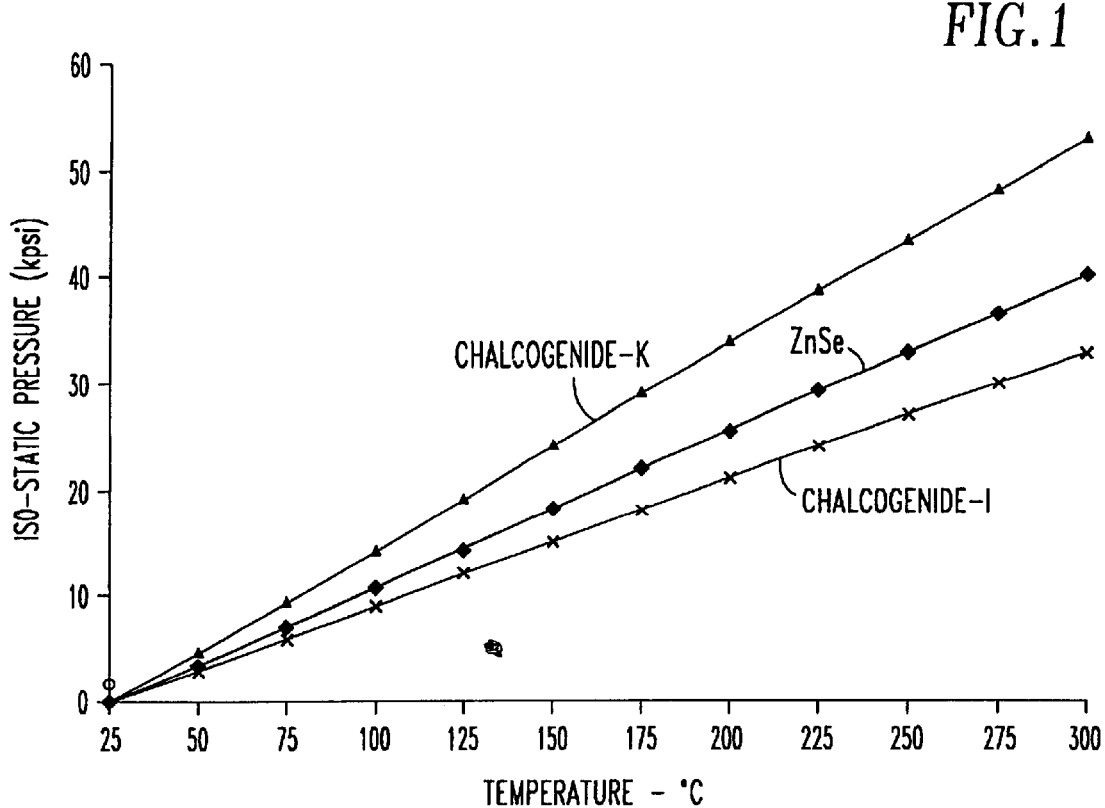
FIG. 1 illustrates the pressure-temperature critical lines for polycrystalline diamond and one substrate and two bonding materials in order to ensure that the expansions of the substrate and the bonding materials match the expansion of polycrystalline diamond.

Further scope of applicability of the present invention will become apparent from the detailed description given hereafter. However, it should be understood that the detailed description and specific examples, while indicating preferred embodiments of the invention are given by way of illustration only, since various changes and modifications within the spirit and scope of the invention will become apparent to those skilled in the art from this detailed description.

DETAILED DESCRIPTION OF THE PREFERRED EMBODIMENT

Three processes are available to ensure a proper bond among many choices of bonding material and substrates. These are the "vacuum press" (VP) process, the "rapid pulse heater" (RPH) process and the "hot isostatic pressure" (HIP) process. In one embodiment, the present invention utilizes the "hot isostatic pressure" process.

The present invention, which will be set forth below, pertains to other bonding materials including chalcogenide glasses, organic polymers or any other bonding materials which can be remelted and resolidified. The process and explanation of its benefit follow.

The present invention is a novel apparatus and method which can be used to reduce or eliminate residual stress after a thermo-set bonding together of two or more dissimilar materials. Although the present invention is useful in a wide range of bonding applications, the following detailed description of the preferred embodiment to follow will focus on optical (both visible and infrared) bonding applications, where it is desired to bond a thin layer of polycrystalline diamond (PCD) onto a thicker substrate of zinc selenide (ZnSe). The present invention provides a technique by which the PCD and ZnSe can be bonded together at an elevated temperature and pressure, where the bonding material solidifies or sets, but will still be free from stress after cooling to some lower temperature and returning to atmospheric pressure.

The stress under consideration here arises from the difference in the coefficients of thermal expansion (CTE) between PCD and ZnSe, and it is assumed that the bonding material is quite rigid, allowing no slippage between the PCD and ZnSe surfaces as the cooling proceeds. A bonding material of practical interest which behaves in this fashion is arsenic trisulphide glass whose chemical composition is approximately As$_2$S$_3$ and whose softening temperature is about 200° C. Other chemical elements, examples being germanium and/or selenium, can be added to the As$_2$S$_3$ to create entire families of similar materials.

Mathematical analysis, using handbook values for the Young's moduli and CTE's for diamond and ZnSe, has shown that long beams of PCD and ZnSe, bonded together at the solidification is temperature of As$_2$S$_3$ (approximately 200° C.) and at atmospheric pressure, would be highly stressed when cooled back to room temperature.

If the thickness of the bonding material is assumed to be negligible, then a 300 micron thick PCD layer bonded to a half inch thick beam of ZnSe would show a compressive stress of 500 megapascals. The ZnSe would show a tensile stress of about 48 megapascals at the interface with the PCD and a compressive stress of about 25 megapascals at its other surface. Fracture stress values in handbooks are listed as 700 megapascals for diamond and 50 megapascals for ZnSe. As a consequence, being able to have these stress levels approach zero at or near room temperature would be of considerable practical significance.

One significant feature of the present invention, which allows a stress-free composite structure (at some temperature well below the bonding layer solidification temperature), is the application of a large isostatic pressure during the actual bonding process. The present application discloses, in terms of well-known material parameters, how to determine what the value of the isostatic pressure should be in order to achieve the desired stress-free state.

The inventiveness of the present invention can be understood by considering a slab of PCD and a slab of ZnSe that have been machined so that they have identical widths and lengths at room temperature and pressure The thickness values are immaterial. The two slabs are then heated above room temperature. Since the CTE for ZnSe is about 4 times larger than that for PCD, the ZnSe slab's length and width will both be larger at this elevated temperature than the corresponding PCD values. However, the application of isostatic pressure to the two slabs, maintaining them at the same temperature, causes both slabs to contract. A quantity called a material's bulk modulus is the ratio of the applied pressure to the fractional decrease in volume. Since the bulk modulus for PCD is more than 8 times larger than that of ZnSe, one can clearly find an applied isostatic pressure at which the PCD and ZnSe slabs are once again the same length and width. This length and width will be different, of course, from the length and width at room temperature and atmospheric pressure.

This process can be repeated at every temperature, and a critical line can thus be defined in the pressure-temperature (P-T) plane. If the pressure and temperature values are maintained on this line when the solidification of the bonding layer takes place, then the two slabs will remain substantially stress-free as long as one stays on the critical line, as long as stresses introduced by the bonding layer are negligible enough to ignore. The stresses in the PCD and ZnSe can be made negligibly small by making the bonding layer very thin. However, a way will be discussed below to accommodate thicker bonding layers, so that the bonding layer is also stress-free and therefore would not be required to be very thin.

One can derive a mathematical equation for the critical line in the P-T plane. To do this derivation, one starts with expressions for the fractional length changes introduced by temperature and pressure:

$$(\Delta l/l)_{td} = \int_{T_r}^{T} \alpha_d(T, P) dT \qquad \text{Eq. (1)}$$

$$(\Delta l/l)_{ts} = \int_{T_r}^{T} \alpha_s(T, P) dT \qquad \text{Eq. (2)}$$

-continued $$(\Delta l/l)_{pd} = \int_{P_r}^{P} [3\beta_d(T, P)]^{-1} dP \qquad \text{Eq. (3)}$$

$$(\Delta l/l)_{ps} = \int_{P_r}^{P} [3\beta_s(T, P)]^{-1} dP \qquad \text{Eq. (4)}$$

where the subscripts "d" and "s" refer to dimond and substrate, where the subscripts "t" and "p" refer to temperature and pressure, wherein the CTE's are given by α's and are shown explicitly to be functions of temperature and pressure, where the bulk moduli are given by β's and are also shown explicitly to be functions of temperature and pressure, wherein $T_r$ and $P_r$ are reference temperatures and pressures, respectively, and where T and P are the temperature and pressure on the P-T plot. The factor of 3 in Eqs. (3) and (4) results from equating the fractional volume change to 3 times the fractional length change, which is an excellent approximation when (Δl/l) is much less than unity.

Equating the difference between Eq. (1) and Eq. (3) to the difference between Eq. (2) and Eq. (4) leads to the equation for the critical line in the P-T plane. The simplified case where both the CTEs and the bulk moduli are considered constants will be discussed as an example. In this case, the equation for the critical line becomes $$(P-P_r)(\beta_d-\beta_s)=3\beta_d\beta_s(\alpha_s-\alpha_d)(T-T_r) \qquad \text{Eq. (5)}$$

The bulk modulus is related to the Young's modulus (E) according to $$E=3\beta(1-2\mu) \qquad \text{Eq. (6)}$$

where $\mu$ is Poisson's ratio. By using handbook values for the Young's moduli, the Poisson's ratios, and the CTE's of PCD and ZnSe, the necessary values can be calculated to plot Eq. (5). Plots of Eq. (5) are shown in FIG. 1 for $P_r$=1 atmosphere and $T_r$=25° C. for three different material pairs. In FIG. 1, the PCD-ZnSe pair is identified with the symbol Δ.

From FIG. 1 it is apparent the that application of about 26,000 psi is necessary to bring the slabs of PCD and ZnSe back to the same size at 200° C. This combination of pressure and temperature is well within the range of commercially available HIP equipment. As a result, the present invention is directed to an apparatus and method which determines the proper pressure and temperature to perform thermo-set bonding of dissimilar materials in an HIP environment so as to avoid the stress problems that would result after cooling if the proper pressure was not applied.

As stated above, the bonding material could introduce stress into the composite structure if the bonding layer were not extremely thin. In many practical cases, the bonding layer cannot be extremely thin, so it is desirable to determine a suitable bonding material that does not introduce stress into the composite material, if the bonding layer is of reasonable thickness.

As discussed above with respect to the PCD and the ZnSe, Equation (5) can be applied to the bonding material, as well as the substrate material. As a result, if the bonding material has values for its CTE, Young's modulus, and Poisson's ratio such that the critical line in the P-T plot for the PCD-bonding material pair coincides with the critical line for the PCD-substrate material pair, then the three-layered structure will remain substantially stress-free at any point on that line. Similarly, a pair of materials whose critical lines are close together on the P-T plot will lead to less stress than a pair of materials that are far apart on the P-T plot. In this case, bonding materials would be selected so that their critical lines match that of the prospective substrate.

Two other critical lines are illustrated in FIG. 1. The top line corresponds to PCD paired with a glass whose composition is $As_{32}S_{48}Se_{20}$ (composition K), while the glass composition for the bottom line is $As_{40}S_{50}Se_{10}$ (composition I). The measured CTE's for these two compositions are 41.6 and 29.6, respectively (both in units of $10_{-6}°$ $C.^{-1}$). It is highly likely that an intermediate composition will have a critical line that closely approaches that of ZnSe.

By specifically engineering the glass to produce a desirable critical line, a composite window structure can be produced which is completely free from stress at the selected reference temperature. The diamond, the glass, and the ZnSe will all be stress-free, and the bonding process will have been done with the structure in thermal equilibrium and will not have required the complications of pulsed heating.

If, however, the bonding material's critical line on FIG. 1 cannot be engineered to match that of ZnSe, the desired result can still be achieved (i.e. a completely stress-free composite structure at the reference temperature) by adding rapid pulsed heating to the HIP-modified bonding procedure.

Consider glass composition I, for example. FIG. 1 indicates that the pressure required at the time of solidification (about 200° C.) is about 21,000 psi. FIG. 1 also shows that ZnSe at this same temperature and pressure would be too large in size, since 26,000 psi is the critical pressure for ZnSe at this temperature. However, if the HIP temperature is lowered enough, holding the pressure at 21,000 psi, a point will be found at which the ZnSe exactly matches the size of diamond and glass composition I at the 21,000 psi and 200° C. point. Then the diamond, chalcogenide, and surface of the ZnSe are pulse-heated back up about 200° C. and to create the desired stress-free bond, since the ZnSe will increase in size only slightly as a result of the heat pulses. In fact, whatever thermal expansion does occur in the ZnSe due to the heat pulse can be compensated for by starting from a slightly lower HIP temperature than gave the correct quasi-static size for the ZnSe.

Figure 2:
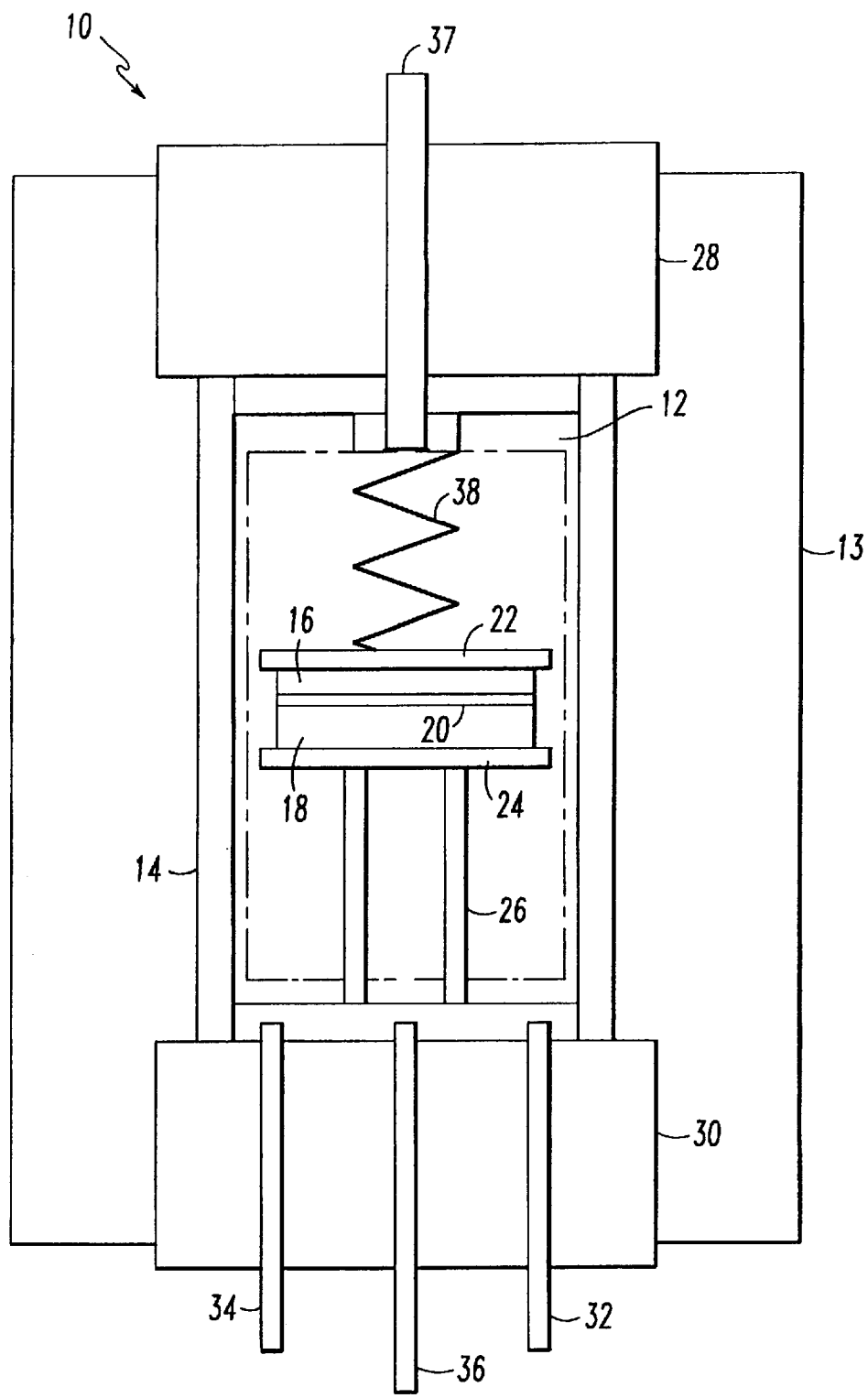
FIG. 2 is a hot isostatic pressure (HIP) bonding apparatus utilized in one embodiment of the present invention.

The HIP bonding apparatus 10, in one embodiment of the present invention, is illustrated in FIG. 2. The HIP bonding apparatus 10 includes a high-pressure chamber 12 with walls 13 which are 3½ inches thick, which is insulated with thermal insulation 14. The first layer 16, second layer 18, and an optional bonding layer 20 are placed in the high pressure chamber 12 between upper 22 and lower 24 heater elements which include thermocouples. The bonding layer is optional because the first layer 16 and the second layer 18 could be bonded by the temperature, pressure and force with the HIP bonding apparatus 10. In one embodiment where the bonding layer 20 is utilized, the bonding layer 20 bonds the first layer 16 and the second layer 18 by thermal diffusion. The first layer 16, the second layer 18, and the bonding layer 20 are supported by holding fixtures 26 within the high pressure chamber 2. The high pressure chamber 12 also doubles as a vacuum chamber. The HIP bonding apparatus 10 includes an upper head assembly 28 and a lower head assembly 30, both of which are 8 inches thick. The lower head assembly 30 includes power lead feed through 32, thermocouple feed through 34, and a path for argon gas 36. The upper head assembly 28 includes a pipe for vacuum feed through a spring actuation mechanism 37. The spring actuation mechanism 37 imparts a force to spring 38 which forces the first layer 16 and the second layer 18 together within the high pressure chamber 12.

In a preferred embodiment, a computer is utilized to produce the critical line plots based on Equations (1)–(6) and the temperature and pressure values determined by the computer are input to the HIP bonding apparatus 10.

In summary, the embodiment of the present invention set forth above provides a solution to the problem of the stress arising from differential thermal contraction in a multi-layer composite structure. It should be noted that the calculations for FIG. 1 were done for the case where room temperature and one atmosphere pressure occurred together on all of the critical lines. It is not required that room temperature be selected. Any other temperature (below the bonding layer solidification temperature) could have been selected. In general, one would select this temperature to be near the middle of the temperature range required by the application. In this manner, the structure's stress state can be optimally matched to the application. In so doing, the intrinsically available temperature range is approximately doubled since temperatures above, as well as below, the stress-free state can be reached without re-melting the bonding layer. If the bonding is done without the benefit of pressure, the temperatures above the stress-free state (at the bonding temperature) cannot be usefully employed.

In the preferred embodiment, a polycrystalline diamond was utilized. However, this layer could also be made of sapphire or any other material suitable for an infrared window, which provides adequate optical properties as well as good mechanical protection against environmental hazards, such as rain, sleet, sand, and insects, which are encountered by infrared windows mounted on moving vehicles. Further, the preferred embodiment described above utilizes a substrate of ZnSe. However, the substrate could also be any other material suitable for an infrared window, such as zinc sulfide, silicon, or germanium, which posses the optical properties required for an infrared window operating as part of a FLIR or IRST system. Further, the bonding material discussed in the preferred embodiment above, is a glass composition. This glass composition could include any mixture of arsenic and sulfur. Additionally, this mixture may include quantities of selenium and/or germanium and/or tellurium, in order to simultaneously achieve the desired optical properties and desired softening temperature.

As set forth above, three processes are available which produce a bond among many choices of bonding materials and substrates; the "vacuum press" (VP) process, the "rapid pulse heater" (RPH) process and the "hot isostatic pressure" (HIP) process. The first embodiment of the present invention, disclosed above, involved the HIP process. A second embodiment of the present invention, further discussed below, involves the "rapid pulse heater" (RPH) process.

The conventional VP process used for bonding PCD to ZnSe is done in high vacuum so as to avoid bubbles both inside the chalcogenide layer and at the interfaces between the chalcogenide layer and the surrounding PCD and ZnSe. The constituent parts are not pressed together until they are all brought up to the temperature (240 °C. for the most common chalcogenide glass) at which the viscosity of the molten chalcogenide has reached a sufficiently low level. After the pressure has been applied to the multi-layer composite, but with the temperature still at the same point, the vacuum system is brought up to atmospheric pressure by injecting nitrogen gas. With the system at atmospheric pressure, the entire press is brought back to room temperature. In some cases, pausing for an extended period at an intermediate temperature is performed in an attempt to anneal the composite structure, in order to reduce the residual stress.

As set forth above, residual stress in dissimilar material multi-layer composites is a major problem. This stress arises from the mismatch in the coefficients of thermal expansion (CTE) of the composite constituents. In units of $10^{-6}$ °C$^{-1}$, these temperature (in C.°) dependent coefficients are 1.13+0.0065xT for diamond, 7.1+0.0060 xT for ZnSe, and about 25 for a common chalcogenide. At 100° C., the CTE of ZnSe is more than 4 times that of PCD. To illustrate the stress resulting from these values for the CTE's, one can utilize the equations for the thermally induced bending of a bimetallic strip using values for the Young's moduli of the three materials. This approach shows that a layered structure composed of 300 microns of diamond, 50 microns of chalcogenide, and half an inch of ZnSe at room temperature would have, if the chalcogenide had solidified at 200° C., about 500 megapascals of compressive stress in the diamond, 36 megapascals of tensile stress in the chalcogenide, and 48 megapascals of tensile stress in the ZnSe at the interface between the chalcogenide and the ZnSe. At the other surface of the ZnSe there would be a compressive stress of about 25 megapascals.

These stress levels are too high to make the manufacture of such a multi-layer composite practical. Known fracture stress levels are 700 megapascals for diamond, 18 megapascals for chalcogenide, and 50 megapascals for ZnSe. It is well known that fracturing under stress occurs when pre-existing cracks begin to grow or when new cracks nucleate and grow from defects in the stressed material. Consequently, the known values can be taken only as a general guide. However, the chalcogenide layer frequently shatters when the planar composite samples are cooled to room temperature, and the ZnSe substrates often develop an extensive network of cracks near the chalcogenide/ZnSe interface.

In samples that do not delaminate by the time they reach room temperature, direct evidence of their highly stressed state may be obtained by measuring the curvature of the back side of the ZnSe. The bimetallic beam equations predict, for the case discussed in the preceding paragraph, that the radius of curvature will be about 12 meters. Curvatures of this general magnitude are seen experimentally.

One way to solve this stress problem would be by selecting materials whose thermal coefficients were well matched. Unfortunately, it is difficult to select such materials whose thermal coefficients are well matched and also meet the optical property requirements of an infrared window utilized in a FLIR system. The second embodiment of the present invention considerably reduces the magnitude of the stress problem by creating a dynamic, non-equilibrium thermal state in the composite structure such that the diamond and chalcogenide layers are both at temperatures above the chalcogenide's softening temperature but in which only the interfacial surface of the ZnSe is that hot; the remainder of the ZnSe is at its initial (cooler) temperature.

The thermal energy in the hot portions of the composite will diffuse into the originally cool portion of the ZnSe, and the chalcogenide will solidify as it passes through its softening temperature. However, at this point the bulk of the ZnSe is still relatively cool, so it has not expanded nearly as much as would have been the case with uniform heating. Consequently, the solidification takes place with the diamond hot and thermally expanded, but with the ZnSe interfacial surface hot but not thermally expanded (since it is constrained from expanding by being an integral part of the mostly cool ZnSe substrate). One can use this approach to obtain bonded composite structures in which neither the diamond nor the ZnSe is appreciably stressed at room temperature.

Figure 3:
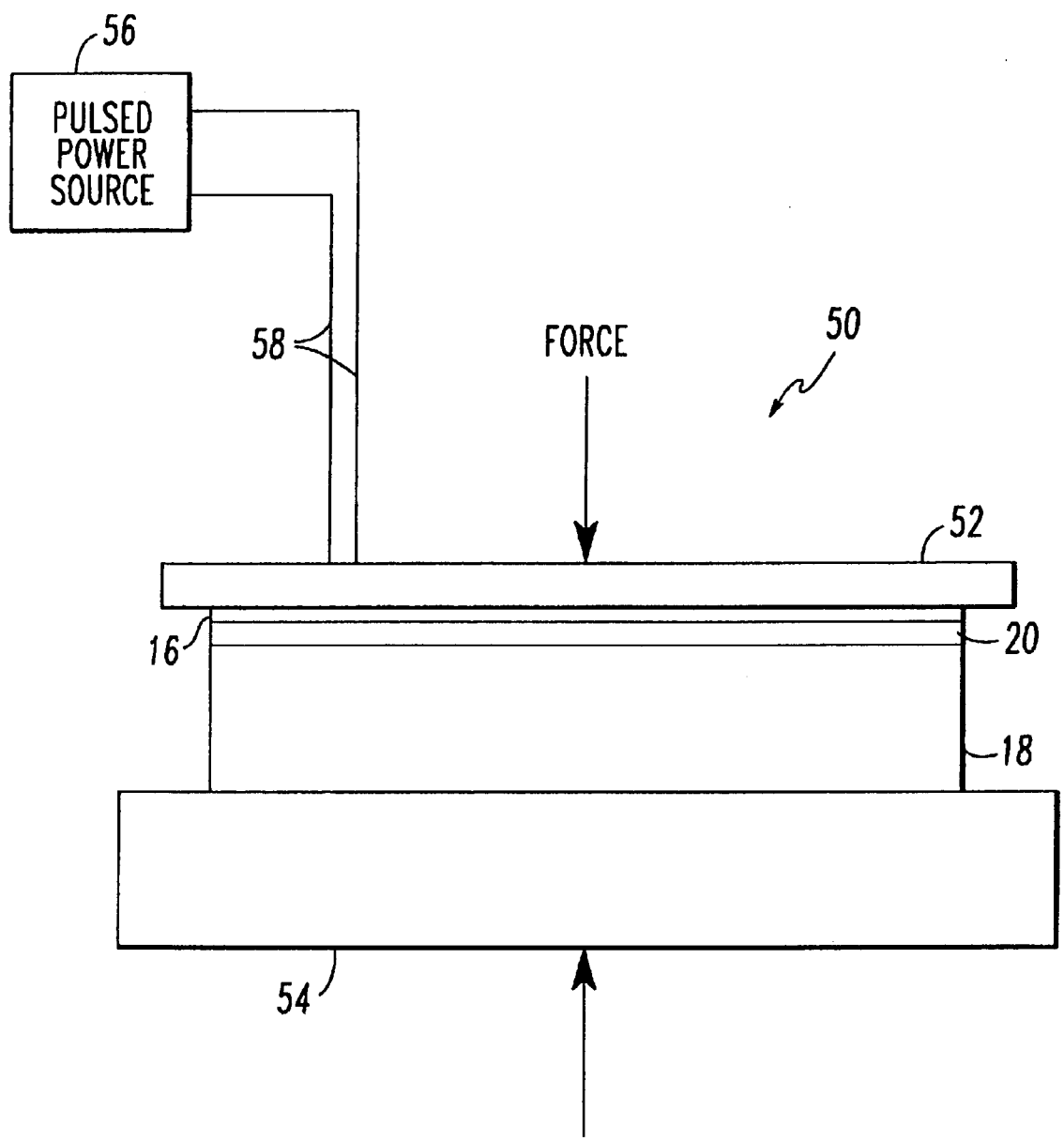
FIG. 3 is a pulsed heating apparatus utilized in another embodiment of the present invention.

A pulsed heating apparatus 50, utilized in one embodiment of the present invention, is illustrated in FIG. 3. The pulsed heating apparatus 50 includes a pulsed heating element 52 and a heat sink 54. The pulsed heating element 52 is connected to a pulsed power source 56 by power leads 58. The first layer 16, the second layer 18, and the optional bonding layer 20 are placed between the pulsed heating element 52 and the heat sink 54. Force is applied to both the pulse heating element 52 and the heat sink 54, which in addition to the heat pulses provided from the pulsed power source 56 are utilized to bond the first layer 16 to the second layer 18, either with or without bonding material 20. The bonding layer is optional because the first layer 16 and the second layer 18 could be bonded by the temperature and force applied by the pulsed heating apparatus 50. In one embodiment where the bonding layer 20 is utilized, the bonding layer 20 bonds the first layer 16 and the second layer 18 by thermal diffusion. In a preferred embodiment, a computer is utilized to produce the critical line plots based on Equations (1)–(6) and the temperature values determined by the computer are input to the pulsed heating apparatus 10.

This pulsed heating concept has been demonstrated on 1" diameter planar test samples. A commercial flat-plate heater, composed of a sixteenth inch thick boron nitride substrate on which had been deposited a thin paralytic carbon heating element, was used to supply the heat pulse. The heater was run at a power density of about 125 watts/cm$^2$, and a pulse duration of slightly less than 1 second optimized the stress reduction. These demonstrations were done with the starting temperature of the sample and heater near room temperature and with the diamond face of the composite structure in thermal contact with the paralytic carbon face of the heater.

Figure 4:
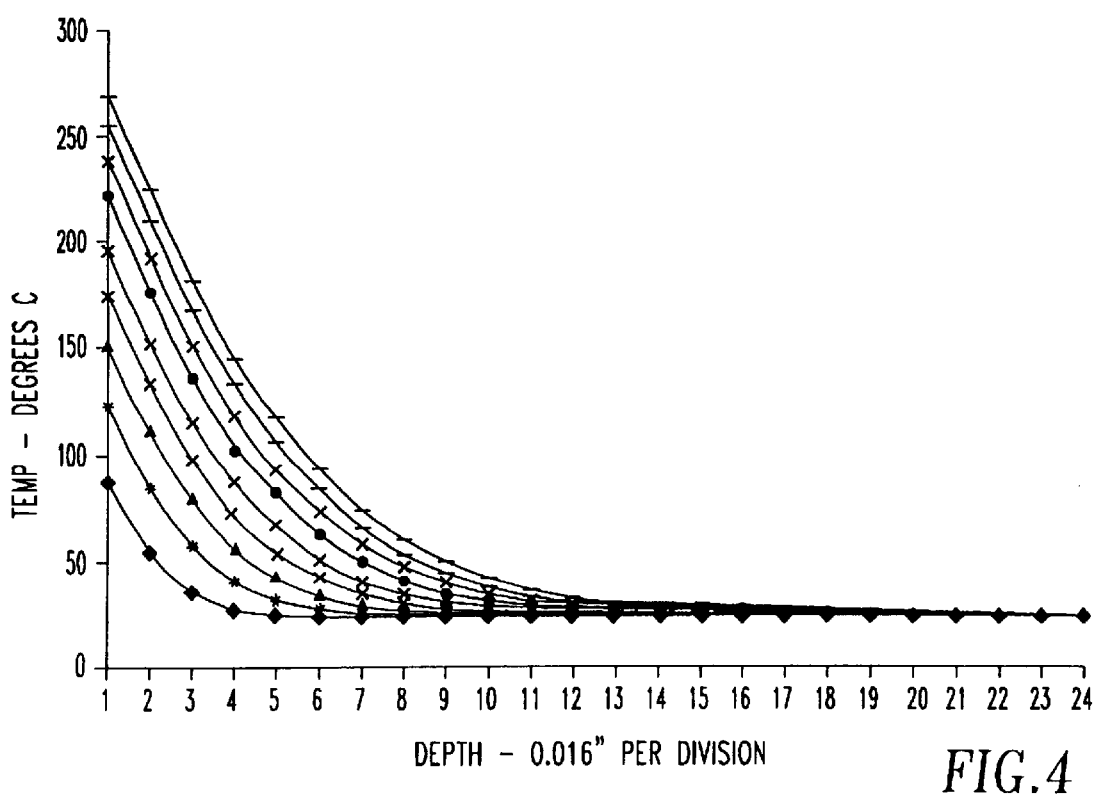
FIG. 4 is a graph of calculated temperature as a function of depth into a ZnSe substrate in 30 millisecond intervals after the onset of a thermal pulse with a power density of 380 watts/cm$^2$.

A scaled-up pulsed heating apparatus would accommodate planar samples up to 6" in diameter and would allow an input power density of 380 watts/cm$^2$. Known values of the specific heats, thermal conductivities, and densities of the composite structure's components were used-for this analysis. The results for the ZnSe temperature as a function of substrate depth and time are illustrated in FIG. 4. Results were determined in 30 millisecond intervals, for a thermal pulse lasting for 270 milliseconds. The nine plots in FIG. 4 correspond to the temperature as a function of depth after each of these intervals.

The substrate for the example shown in FIG. 4 was very thick so that the heat pulse never (during the time scale of interest herein) reached the other side. The right-hand edge of the plot in FIG. 4 corresponds to a depth of about ⅜", for example. Consequently, the surface temperature is about 270° C. at the end of the 270 millisecond pulse but the temperature is less than 60° C. an eight of an inch below the surface. These conditions exemplify the situation outlined in the preceding paragraph in which only the ZnSe surface is hot and where the mechanical size of the ZnSe has only modestly expanded above its room temperature value.

To achieve a substantially stress-free bond the intensity and duration of the heat pulse may be determined either empirically or by standard mathematical analysis of the transient heat flow problem, both of which are known to one of ordinary skill in the art.

Figure 5:
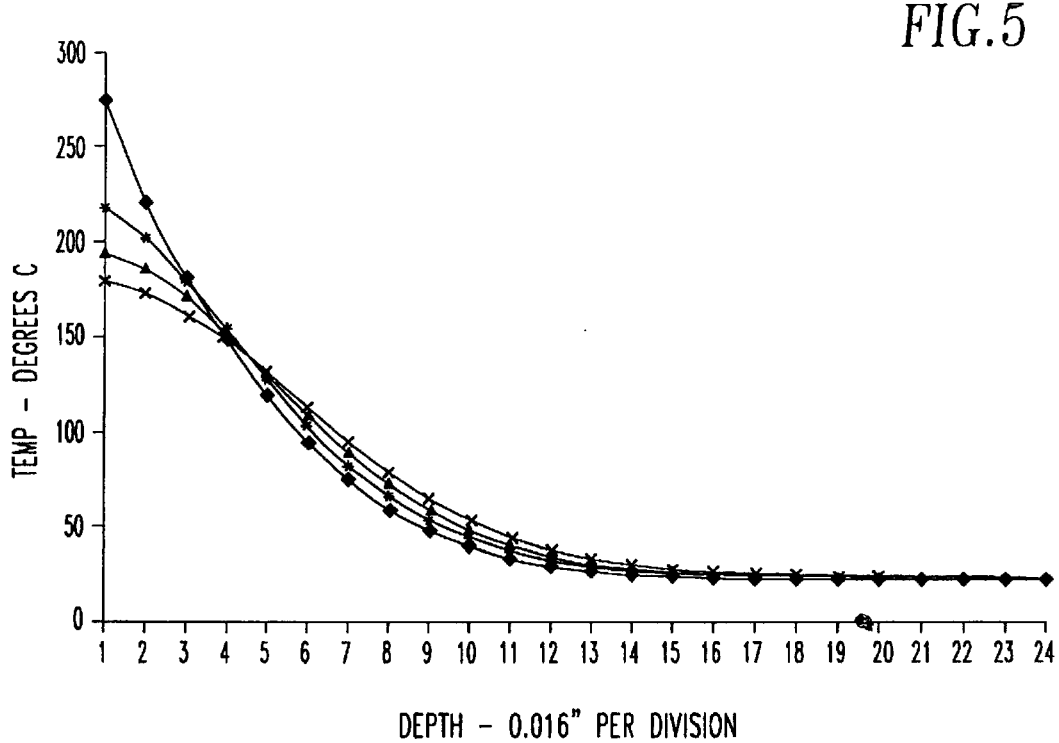
FIG. 5 illustrates a calculated temperature as a function of depth into a ZnSe substrate in 30 millisecond intervals after turning of f the 270 millisecond long pulse illustrated in FIG. 2 (the curve marked with the symbol "♦" is the temperature profile at the time the thermal pulse is turned off)

The calculated cool-down of the ZnSe surface is shown in FIG. 5. The line that intersects the ordinate at 270° C. is the 270 millisecond line from FIG. 4 and corresponds to the temperature profile at the end of the thermal pulse. The other three lines in FIG. 5 provide thermal profiles 30, 50, and 90 milliseconds later. As illustrated in FIG. 5, the ZnSe interface temperature is nearly down to 180° C. at the point in time that corresponds to 360 milliseconds after the thermal pulse was first turned on. Consequently, it is practical to use pulse heating to equalize the expansion between diamond and ZnSe. The energy stored in thermal profiles illustrated in FIG. 5 corresponds to an average increase of about 40° C. above ambient for a substrate that is ⅜" thick. This average temperature value can be used as an estimate of the expansion of the ZnSe that would exist when the chalcogenide softened. Using the thermal expansion coefficients given above, one can show that the ZnSe doesn't expand quite enough in this example and that a slightly lower power density and longer pulse would match these values exactly.

While the diamond and ZnSe can be matched in this way, the chalcogenide remains highly stressed. Optimal pulsed-heating bonding of a PCD/Chalcogenide/ZnSe composite structure will leave the chalcogenide in the same highly stressed state that would result from the equilibrium-temperature bonding of a PCD/Chalcogenide/PCD composite. The stress level in the chalcogenide can be reduced by making its CTE smaller. To get zero stress, one must match the CTE of chalcogenide with that of PCD. Significant improvement has been obtained in this regard by mixing fine diamond powder in with the chalcogenide. However, it should be noted that the stress created in the ZnSe and PCD by the mismatch in CTE's between PCD and chalcogenide can be made fairly small by reducing the chalcogenide thickness to a smaller and smaller value.

Figure 6:
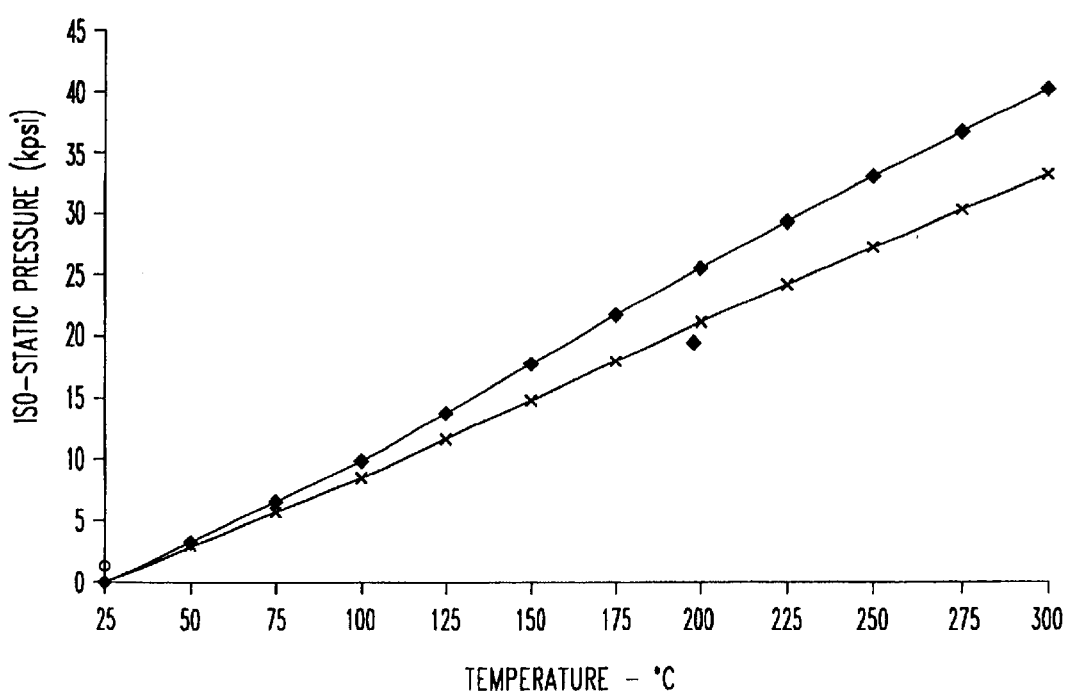
FIG. 6 illustrates plots in the pressure-temperature plane showing where ZnSe (♦) and a chalcogenide- glass (x) maintain the same physical dimensions as similar layers of polycrystalline diamond.

When the bonding application allows very thin chalcogenide layers, then the pulsed heating technique can be used to produce bonded composites in which the PCD and ZnSe are both substantially stress free. But when the bonding layer cannot, for practical reasons, be made thin enough, then pulsed heating must be used in conjunction with the invention set forth in the first embodiment, in order to produce totally stress-free composites. As disclosed in the first embodiment, there is a line in the pressure-temperature plane along which PCD and ZnSe remain the same size. These two lines are shown in FIG. 6, wherein the upper line corresponds to ZnSe. The methodology for determining these lines is described in the first embodiment of the present invention, set forth above. The chalcogenide shown in FIG. 6 softens at about 200° C. Consequently, the combined bonding process should have the actual solidification of the chalcogenide occur at a pressure of about 21,000 psi, which is where FIG. 6 indicates that the PCD and chalcogenide will be matched in size. However, the ZnSe should only be at this temperature right at the surface where the bonding is taking place. FIG. 6 indicates that the ZnSe would be expanded too much if it was in equilibrium at 21,000 psi and 200° C. but that it would be the correct size at 21,000 psi and about 175° C.

As a result, the use of pulse heating in conjunction with the HIP process (starting from an equilibrium condition at 21,000 psi and about 175° C.) will create a three-layered composite structure which, at room temperature and pressure, will be stress-free in all three layers. The HIP process is used to size-match the PCD and chalcogenide at the instant of bonding, and the pulsed heating process is used to adjust the size of the ZnSe at the same instant.

It is clear that pulse-heating assisted bonding is applicable to materials other than PCD/Chalcogenide/ZnSe. The requirements are that one be able to create the appropriate thermal gradient through the thickness of the composite structure so as to compensate for the differences in CTE's and that the material with the smaller CTE be at the higher temperature in this gradient. The process is probably easiest to visualize when the temperature is approximately constant across a relatively thin layer with large thermal conductivity (such as the PCD) and when the other layer is hot only near one surface (such as the ZnSe). The pulsed heating apparatus 50 of FIG. 3 could also be utilized in conjunction with the HIP bonding apparatus of FIG. 2, in order to produce a substantially stress-free multi-layer structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A process for producing a stress-free bond at ambient temperature and pressure between two layers of dissimilar material comprising the steps of:
    (a) providing a first layer with a coefficient of thermal expansion which is smaller than a coefficient of thermal expansion of a second layer, with a thickness which is smaller than a thickness of the second layer, and with a thermal conductivity which is larger than a thermal conductivity of the second layer;
    (b) providing a bonding layer, having a thickness substantially less than the thickness of the first layer, with a softening temperature above the ambient temperature, at the ambient pressure;
    (c) arranging the first layer and the second layer, with the bonding layer in between the first layer and the second layer;
    (d) placing a heat sink in thermal contact with a surface of the second layer opposite to a surface which is in contact with the bonding layer;
    (e) placing a pulsed heat source in thermal contact with a surface of the first layer which is opposite to a surface which is in contact with the bonding layer;
    (f) applying a compressional force between the pulsed heat source and the heat sink so as to compress the first layer and the second layer so that the bonding layer flows when the bonding layer reaches its softening or melting temperature; and
    (g) applying a heat pulse of an intensity and duration sufficient to melt or soften the bonding layer to raise an interfacial surface temperature of the second layer above a melting or softening temperature of the bonding layer without substantially heating a remainder of the second layer.

2. The process of claim 1, wherein the intensity and duration of the heat pulse are such that a relatively low-stress bond is formed between the first layer and the second layer.

3. The process of claim 1, wherein the first layer and the second layer are made of materials suitable for an infrared window mounted on high speed aircraft operating as part of a FLIR or IRST system.

4. The process of claim 3, wherein the bonding layer is a glass including arsenic and sulphur.

5. The process of claim 3, wherein the bonding layer is a polymer material.

6. An apparatus for bonding together two layers of dissimilar material, yielding a composite structure which is stress-free at a selectable reference temperature and reference isostatic pressure, comprising:
    (a) means for supporting a first layer and a second layer;
    (b) means for determining a critical line for the first layer and the second layer in a pressure-temperature plane, wherein a location of the critical line depends on the selectable reference temperature and reference isostatic pressure and depends on coefficients of thermal expansion and bulk moduli material constants of the first layer and the second layer, wherein the critical line sets forth a plurality of temperature-pressure pairs at which the composite structure will be substantially stress-free;
    (c) means for controlling a temperature and isostatic pressure during bonding such that the temperature and the isostatic pressure represent one or more points on the critical line; and
    (d) means for bonding the first layer and the second layer at the temperature and the isostatic pressure in said step (c);
    (e) means for returning to the selectable temperature and reference isostatic pressure after bonding is complete by following a path in the pressure-temperature plane which avoids imposing disruptive stresses on the composite structure.

7. The apparatus of claim 6, wherein said means for supporting supports a third layer between the first layer and the second layer to produce a bond between the first layer and the second layer by pressing the first layer and the second layer into intimate contact with the third layer when the third layer is in a low-viscosity condition so that the third layer flows and facilitates the intimate contact.

8. The apparatus of claim 7, wherein the third layer is made from a thermo-setting material that is transformed from a liquid-like state into a solid-like state by application of elevated temperatures.

9. The apparatus of claim 7, wherein the third layer is made from a material such as glass whose viscosity decreases with increasing temperature so that the glass which is solid-like at lower temperatures softens and flows like a liquid at higher temperatures but regains its original viscosity when cooled back to the lower temperatures.

10. The apparatus of claim 7, wherein the third layer is made from a material in which a physical phase transition from a solid state to a liquid state occurs as the along or near the critical line in the pressure-temperature plane.

11. The apparatus of claim 6, wherein bonding by said means for bonding occurs at a point or points near the critical line in the pressure-temperature plane.

12. The apparatus of claim 6, wherein the first layer and the second layer are made of materials suitable for an infrared window mounted on moving vehicle operating as part of a FLIR or IRST system.

13. The apparatus of claim 12, wherein the third layer is a glass including arsenic and sulphur.

14. The apparatus of claim 12, wherein the third layer is made of a polymer material.

15. The apparatus of claim 6, wherein the temperature and the isostatic pressure in said means for controlling is provided using a hot isostatic pressure (HIP) apparatus.

16. The apparatus of claim 6, wherein the bulk modulus of the first layer is larger than the bulk modulus of the second layer and the coefficient of thermal expansion of the first layer is smaller than the coefficient of thermal expansion of the second layer.

17. The apparatus of claim 6, wherein the bulk modulus of the first layer is smaller than the bulk modulus of the second layer and the coefficient of thermal expansion of the first layer is larger than the coefficient of thermal expansion of the second layer.

18. The apparatus of claim 6, wherein the critical line in the pressure-temperature plane for the first layer and the second layer is determined according to:

$$(\Delta l/l)_{tf} - (\Delta l/l)_{pf} - (\Delta l/l)_{ts} - (\Delta l/l)_{ps},$$

where:
- $(\Delta l/l)_{tf}$ = a fractional length change of the first layer as a function of temperature with pressure as a parameter;
- $(\Delta l/l)_{pf}$ = a fractional length change of the first layer as a function of pressure with temperature as a parameter;
- $(\Delta l/l)_{ts}$ = a fractional length change of the second layer as a function of temperature with pressure as a parameter;
- $(\Delta l/l)_{ps}$ = a fractional length change of the second layer as a function of pressure with temperature as a parameter;
- and wherein each fractional length change is related to the bulk moduli and the coefficients of thermal expansion for the first layer and the second layer.

19. The apparatus of claim 6, wherein the critical line in the pressure-temperature plane for the first layer and the second layer is determined according to:

$$(P-P_r)(\beta_f-\beta_s)=3\beta_f\beta_s(\alpha_s-\alpha_f)(T-T_r),$$

where:
- $P_r$ = a reference pressure;
- $P$ = a temperature of interest on the critical line;
- $T_r$ = a reference temperature;
- $T$ = a temperature of interest on the critical line;
- $\beta_f$ = the bulk modulus of the first layer;
- $\beta_s$ = the bulk modulus of the second layer;
- $\alpha_s$ = the coefficient of thermal expansion of the second layer; and
- $\alpha_f$ = the coefficient of thermal expansion of the first layer.

20. The apparatus of claim 7, wherein a material is selected or engineered for the third layer such that a critical line in the pressure-temperature plane for the third layer and the first layer or a critical line in the pressure-temperature plane for the third layer and the second layer lies on or substantially near to the critical line for the first layer and the second layer resulting in a composite structure in which the first layer, the second layer, and the third layer are substantially stress-free when returned to the selectable reference temperature and reference isostatic pressure.

21. An apparatus for producing a stress-free bond at ambient temperature and pressure between two layers of dissimilar material comprising:
- support means for supporting a first layer with a coefficient of thermal expansion smaller than a coefficient of thermal expansion of a second layer, with a thickness smaller than a thickness of the second layer, and with a thermal conductivity larger than a thermal conductivity of the second layer, and supporting a thin thermosetting bonding layer with a softening temperature above the ambient temperature, at the ambient pressure;
- wherein the first layer, the second layer and the bonding layer are arranged as a sandwich, with the bonding layer in between the first layer and the second layer;
- a heat sink in thermal contact with a surface of the second layer opposite to a surface which contacts the bonding layer;
- a pulsed heat source in thermal contact with a surface of the first layer which is opposite to a surface which contacts the bonding layer;
- force means for applying a compressional force between the pulsed heat source and the heat sink so as to compress the sandwich so that the bonding layer flows when its softening or melting temperature is reached;
- wherein the pulsed heat source applied a heat pulse to the sandwich of an intensity and duration sufficient to melt or soften the bonding layer and to raise an interfacial surface temperature of the second layer above the melting or softening temperature of the bonding layer without substantially heating a remainder of the second layer.

22. The apparatus of claim 21, wherein the intensity and the duration of the heat pulse are such that a relatively low-stress bond is formed between the first layer and the second layer.

23. The apparatus of claim 21, wherein the first layer and the second layer are made of materials suitable for an infrared window mounted on high speed aircraft operating as part of a FLIR or IRST system.

24. The apparatus of claim 23, wherein the bonding layer is a glass including arsenic and sulphur.

25. The apparatus of claim 23, wherein the bonding layer is a polymer material.

26. An apparatus for bonding together a three layer structure which is substantially stress-free at a selectable reference temperature and reference isostatic pressure, comprising:
- means for providing a first layer, a second layer, and a bonding layer;
- means for determining a critical line for the first layer and second layer in a pressure-temperature plane wherein a location of the critical line depends on the selectable reference temperature and reference isostatic pressure and depends on coefficients of thermal expansion and bulk moduli material constants of the first layer and the second layer, wherein the critical line sets forth a plurality of temperature-pressure pairs at which the composite structure will be substantially stress-free;
- means for selecting as the bonding layer, a material whose critical line with respect to the first layer, has a smaller slope than a slope of the critical line of the first layer and the second layer;
- means for bonding the first layer and the second layer, utilizing the bonding layer;
- means for increasing a temperature of the three layer structure above a softening temperature of the bonding layer;
- means for increasing a pressure of the three layer structure along a path near the critical line for the first layer and the second layer;
- means for decreasing the pressure and temperature of the three layer structure along a path near the critical line for the first layer and the second layer until the pressure of the three layer structure reaches a point which corresponds to the softening temperature of the bonding layer on the critical line for the first layer and the bonding layer;
- means for applying a heat pulse to an outer surface of the first layer of sufficient intensity and duration to bring the first layer and the bonding layer just above the softening temperature of the bonding layer, while maintaining the pressure constant, thereby allowing the bonding layer to harden at pressure-temperature conditions that will be substantially stress-free when the three layer structure is returned to the selectable reference temperature and reference isostatic pressure; and
- means for returning the pressure and temperature of the three layer structure to the selectable reference temperature and reference isostatic pressure along a path near the critical line for the first layer and the second layer.

* * * * *